United States Patent
Syed Muhammad et al.

(10) Patent No.: US 12,144,013 B2
(45) Date of Patent: Nov. 12, 2024

(54) METHOD AND APPARATUS FOR CARRIER AGGREGATION OPTIMIZATION

(71) Applicant: NOKIA SOLUTIONS AND NETWORKS OY, Espoo (FI)

(72) Inventors: Fahad Syed Muhammad, Orsay (FR); Afef Feki, Sceaux (FR); Véronique Capdevielle, Magny les Hameaux (FR); Claudiu Mihailescu, Versailles (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 219 days.

(21) Appl. No.: 17/625,257

(22) PCT Filed: Jul. 10, 2019

(86) PCT No.: PCT/EP2019/068544
§ 371 (c)(1),
(2) Date: Jan. 6, 2022

(87) PCT Pub. No.: WO2021/004629
PCT Pub. Date: Jan. 14, 2021

(65) Prior Publication Data
US 2022/0272711 A1    Aug. 25, 2022

(51) Int. Cl.
*H04W 4/00* (2018.01)
*H04L 5/00* (2006.01)
*H04W 72/542* (2023.01)

(52) U.S. Cl.
CPC ........... *H04W 72/542* (2023.01); *H04L 5/001* (2013.01)

(58) Field of Classification Search
CPC ............ H04W 72/542; H04W 72/0543; H04L 5/001; H04L 5/003; H04L 5/0098
See application file for complete search history.

(56) References Cited

U.S. PATENT DOCUMENTS

| 2012/0282942 A1 | 11/2012 | Uusitalo et al. |
| 2013/0258995 A1 | 10/2013 | Skov et al. |

(Continued)

FOREIGN PATENT DOCUMENTS

| CN | 109756310 A | 5/2019 |
| WO | 2011/142544 A1 | 11/2011 |
| WO | 2017/091115 A1 | 6/2017 |

OTHER PUBLICATIONS

Jun Yan et al., "Hybrid Kernel Based Machine Learning Using Received Signal Strength Measurements for Indoor Localization," IEEE Transactions on Vehicular Technology, vol. 67, No. 3, pp. 2824-2829, Mar. 2018.

(Continued)

*Primary Examiner* — Abdelnabi O Musa
(74) *Attorney, Agent, or Firm* — SQUIRE PATTON BOGGS (US) LLP

(57) ABSTRACT

The invention relates to a method for configuring carrier aggregation for a current user equipment (14) located in a wireless communication network in a coverage area of a base station which is capable of emitting a plurality of carrier components with a plurality transmission beams per carrier component, the method comprising: retrieving quality metrics beams from a database (16) comprising quality metrics associated with a carrier component of the plurality of carrier components and with a user equipment of a plurality of user equipments; determining, using the quality metrics, one or more candidate carrier components to be configured or de-configured for the current user equipment as secondary carrier components; configuring or de-configuring said one or more carrier components.

20 Claims, 3 Drawing Sheets

(56) References Cited

U.S. PATENT DOCUMENTS

| | | | |
|---|---|---|---|
| 2015/0172987 A1* | 6/2015 | Balakrishnan | H04L 5/001 370/331 |
| 2015/0341945 A1* | 11/2015 | Panchal | H04L 5/0098 370/329 |
| 2017/0243113 A1 | 8/2017 | Fukuda et al. | |
| 2019/0098607 A1* | 3/2019 | Zhang | H04L 5/0098 |
| 2020/0252255 A1* | 8/2020 | Sorrentino | H04B 7/0456 |

OTHER PUBLICATIONS

First Office Action dated Jan. 9, 2024 corresponding to Chinese Patent Application No. 201980098303.2, with English translation thereof.

International Search Report and Written Opinion dated Jul. 1, 2020 corresponding to International Patent Application No. PCT/EP2019/068544.

3GPP TS 38.331 V15.5.1 (Apr. 2019), Technical Specification, 3rd Generation Partnership Project; Technical Specification Group Radio Access Network; NR; Radio Resource Control (RRC) protocol specification (Release 15), Apr. 2019.

Communication pursuant to Rule 164(2)(b) and Article 94(3) EPC dated May 28, 2024 corresponding to European Patent Application No. 19739565.0.

Nokia Siements Networks et al., "Algorithms and results for autonomous component carrier selection for LTE-Advanced," 3GPP Draft; R1-084321, 3GPP TSG RAN WG1 #55 Meeting, Prague, Czech Republic, Nov. 10-14, 2008, Nov. 4, 2008, XP050317595.

Notification of Second Office Action dated Jun. 19, 2024 corresponding to Chinese Patent Application No. 2019800983032, with English translation thereof.

Wen Xin et al., Using MATLAB to carry out neural network [M], Beijing: defense Industry Press, Jun. 30, 2015.

* cited by examiner

METHOD AND APPARATUS FOR CARRIER AGGREGATION OPTIMIZATION

FIELD

Various example embodiments relate to methods and apparatuses for carrier aggregation optimization, in particular to methods and apparatuses configuring carrier aggregation for users in a multiple carrier components based mobile communication system with multiple beams per carrier component.

DESCRIPTION OF THE RELATED ART

This section introduces aspects that may help facilitate a better understanding of the disclosure. Accordingly, the statements of this section are to be read in this light and are not to be understood as admissions about what is in the prior art or what is not in the prior art.

Carrier aggregation is of profound importance in modern mobile communication systems where very high bit rate communication can be achieved by aggregating multiple carrier components at different center frequencies and by transmitting simultaneously both in downlink and uplink on aggregated carrier components.

The process of adding or removing one or more secondary carrier components is known as carrier aggregation configuration. Classical ways used to select these secondary carrier components for carrier aggregation configuration are either through blind configuration or through measurement reports, as mentioned in 3GPP TS 38.331. In particular, A6 measurement report as described in 3GPP Release-10 is triggered when neighbor secondary carrier components become offset better than a current secondary carrier component of the user equipment. In this case, the user equipment performs intra-frequency or inter-frequency measurements on the neighboring secondary carrier components and the base station upon receiving the A6 measurement report releases the current secondary carrier component and starts procedure for adding the neighboring secondary carrier components reported in the measurement report. These methods require measurements on the secondary carrier components and frequent overhead on the uplink. These methods consume unnecessary battery of the user equipment and increase network latencies.

Thus, there is a need for methods capable of carrier aggregation configuration with reduced overhead and improved latency.

SUMMARY

In some example embodiments, the disclosure provides a method for configuring carrier aggregation for a current user equipment located in a wireless communication network in a coverage area of a base station which is capable of emitting a plurality of carrier components with a plurality transmission beams per carrier component, the method comprising:
  retrieving one or more quality metrics from a look-up table comprising for each of a plurality of locations of a user equipment of the plurality of user equipments, a quality metric of each carrier component of the plurality of carrier components;
  estimating a location of the current user equipment, and
  selecting one or more candidate carrier components satisfying a quality metric threshold based on the location of the current user equipment and the look-up table.

In an embodiment, a candidate carrier component is to be configured if said candidate carrier component satisfies a predefined criterion, otherwise said candidate carrier component is to be de-configured.

In some example embodiments, such a method may further comprise one or more of the features below.

In a first example embodiment, the database comprises a look-up table comprising for each of a plurality of locations of a user equipment of the plurality of user equipments, a quality metric of each carrier component of the plurality of carrier components or a subset thereof. In this embodiment, the determining of one or more candidate carrier components comprises:
  estimating a location of the current user equipment, and
  selecting one or more candidate carrier components satisfying a quality metric threshold based on the location of the current user equipment and the look-up table.

In an embodiment, the method comprises a step of determining said quality metric of a or each carrier component of the plurality of carrier components or a subset thereof. For example, the quality metric of a carrier component of the plurality of carrier components for a location of a user equipment of the plurality of user equipments is an arithmetic mean of the radio measurements of the plurality of the transmission beams at the location of the user equipment.

The look-up table may further comprise an average number of carrier components per user equipment for each location comprised in the database or a subset thereof.

In some example embodiments, the disclosure provides a method for configuring carrier aggregation for a current user equipment located in a wireless communication network in a coverage area of a base station which is capable of emitting a plurality of carrier components with a plurality transmission beams per carrier component, the method comprising:
  retrieving one or more feature vectors from a database comprising plurality of feature vectors, each feature vector comprising radio measurements of the transmission beams associated with a respective carrier component of the plurality of carrier components
  acquiring radio measurements of the transmission beams of a predefined primary carrier component of the current user equipment, and
  generating a current feature vector for the current user equipment, the current feature vector comprising radio measurements of the transmission beams of the primary carrier component,
  determining, using the one or more feature vectors retrieved from the database, one or more candidate carrier components to be configured or de-configured for the current user equipment as secondary carrier components;
  configuring or de-configuring said one or more carrier components.

In an embodiment, a candidate carrier component is to be configured if said candidate carrier component satisfies a predefined criterion, otherwise said candidate carrier component is to be de-configured.

In some example embodiments, such a method may further comprise one or more of the features below.

In an embodiment, the determining of one or more candidate carrier components may comprise selecting one or more closest feature vectors among the feature vectors retrieved from the database using a distance criterion. In particular, a distance between the current feature vector and each closest feature vectors may be required to be below a predefined distance threshold. Such distance may be a Euclidean distance.

Alternatively, a look-up table may be provided that associates for each of a plurality of locations of a user equipment of the plurality of user equipments an average number of carrier components, the average number metric of carrier components being determined based on the database. In this case, the determining of one or more candidate carrier components may further comprise:
  estimating a location of the user equipment,
  selecting a number of the candidate carrier components based on the location of the current user equipment and a look-up table. For example, the look-up table associates to each location of the current user equipment an average number of carrier components and said average number of carrier components is selected as the number of the candidate carrier components. Said average number may be determined based on the database In an embodiment, the determining of one or more candidate carrier components may comprise:
  selecting one or more candidate carrier components for the current user equipment using the current feature vector and a predefined carrier aggregation model.

Preferably, the carrier aggregation model provides one or more candidate carrier components given the current feature vector. In particular, the carrier aggregation model is a trained neural network, the training of the neural network being performed based on the database.

In an embodiment, each feature vector of the database further comprises a location of the radio measurements of the transmission beams, and the current feature vector further comprises the location of the current user equipment.

In an embodiment, the quality metric is a mean reference signal received power or a mean reference signal received quality or a value of cumulative density function.

In an embodiment, the database comprises a number of radio measurements of transmission beams higher than a predefined number. In particular, the predefined number is a percentage of the total number of radio measurements of the transmission beams over the plurality of transmission beams for all of the plurality of carrier components. In other words, the predefined number can define a level of reliability that the dataset of the radio measurements must achieve in order to be used for carrier aggregation configuration.

In example embodiments, the disclosure also provides a computer program comprising executable code that causes a computer to perform the steps of such methods when executed.

In some example embodiments, the disclosure also provides an apparatus for configuring carrier aggregation for a current user equipment located in a wireless communication network in a coverage area of a base station which is capable of emitting a plurality of carrier components with a plurality transmission beams per carrier component, the apparatus comprising means for performing:
  retrieving one or more feature vectors from a database (16) comprising plurality of feature vectors, each feature vector comprising radio measurements of the transmission beams associated with a respective carrier component of the plurality of carrier components
  acquiring radio measurements of the transmission beams of a predefined primary carrier component of the current user equipment, and
  generating a current feature vector for the current user equipment, the current feature vector comprising radio measurements of the transmission beams of the primary carrier component,
  determining, using the one or more feature vectors retrieved from the database (16), one or more candidate carrier components to be configured or de-configured for the current user equipment as secondary carrier components;
  configuring or de-configuring said one or more candidate carrier components.

In some example embodiments, the disclosure also provides an apparatus for configuring carrier aggregation for a current user equipment located in a wireless communication network in a coverage area of a base station which is capable of emitting a plurality of carrier components with a plurality transmission beams per carrier component, the apparatus comprising means for performing:
  retrieving one or more quality metrics from a look-up table comprising for each of a plurality of locations of a user equipment of the plurality of user equipments, a quality metric of each carrier component of the plurality of carrier components;
  estimating a location of the current user equipment, and
  selecting one or more candidate carrier components satisfying a quality metric threshold based on the location of the current user equipment and the look-up table, and
  configuring or de-configuring said one or more candidate carrier components.

In an embodiment, a candidate carrier component is to be configured if said candidate carrier component satisfies a predefined criterion, otherwise said candidate carrier component is to be de-configured.

In an embodiment, the apparatus comprises a storage medium for storing the database.

In some example embodiments, the disclosure also provides an apparatus for configuring carrier aggregation for a current user equipment located in a wireless communication network in a coverage area of a base station which is capable of emitting a plurality of carrier components with a plurality transmission beams per carrier component, the apparatus comprising:
  at least one processor; and
  at least one memory including a computer program code, the at least one memory and the computer program code are configured to, with the at least one processor, cause the apparatus to at least perform:
  retrieving quality metrics from a database, stored in the at least one memory, comprising quality metrics associated with a or each carrier component of the plurality of carrier components and with a or each user equipment of a plurality of user equipments;
  determining, using the quality metrics, one or more candidate carrier components to be configured or de-configured for the current user equipment as secondary carrier components;
  configuring or de-configuring said one or more carrier components.

BRIEF DESCRIPTION OF THE DRAWINGS

These and other aspects of the invention will be apparent from and elucidated with reference to example embodiments described hereinafter, by way of example, with reference to the drawings.

DETAILED DESCRIPTION OF THE EMBODIMENTS

Embodiments of apparatuses and methods for configuring carrier aggregation will now be described. Carrier aggregation configuration consists in identifying a set of configured carrier components per user equipment. Once the carrier components are configured, the network can decide which carrier components to activate. On the other hand, the de-configuration consists in removing a carrier component for the established list of configured carrier components. Conventionally, the carrier components configuration/de-configuration is based on radio measurements reported by user equipments on different carrier components or it is done blindly. Nevertheless, radio measurements require signaling overhead in order to measure and report the quality metrics of different carrier components per user (knowing that the number of configured carrier components can reach 16 for a given user equipment in a 5G based network) as well as additional latency.

The proposed methods and apparatuses take benefit of a database comprising the radio information reported by the user equipments, using Radio Frequency fingerprinting (RF fingerprinting), to reduce the overhead and the latency in particular in a 5G based network. Radio Frequency fingerprinting identifies a wireless device emitting a radio transmission using the properties of the radio transmission.

Figure 1:
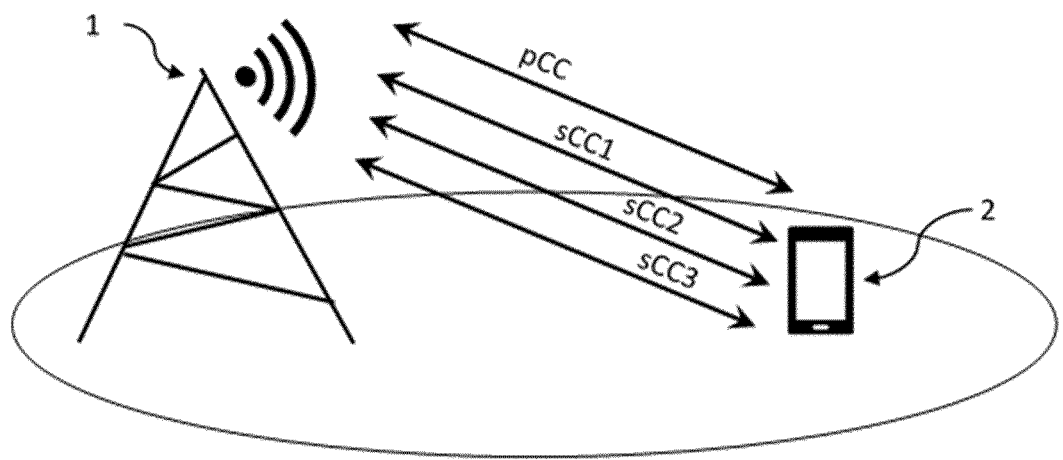
FIG. 1 illustrates a mobile communication system in which methods and apparatuses for configuring carrier aggregation with multiple beams per carrier component, can be implemented.

An example of a communication system for configuring carrier aggregation is provided in FIG. 1. In this example, a base station 1 communicates with a user equipment 2 over four carrier components pCC, sCC1, sCC2, sCC3. One of the carrier components pCC is appointed to act as a primary carrier component and the other carrier components sCC1, sCC2, sCC3 are appointed to serve as secondary carrier components. The base station 1 is a node based on 5G communication network and is capable of emitting a plurality transmission beams per carrier component.

Figure 2:
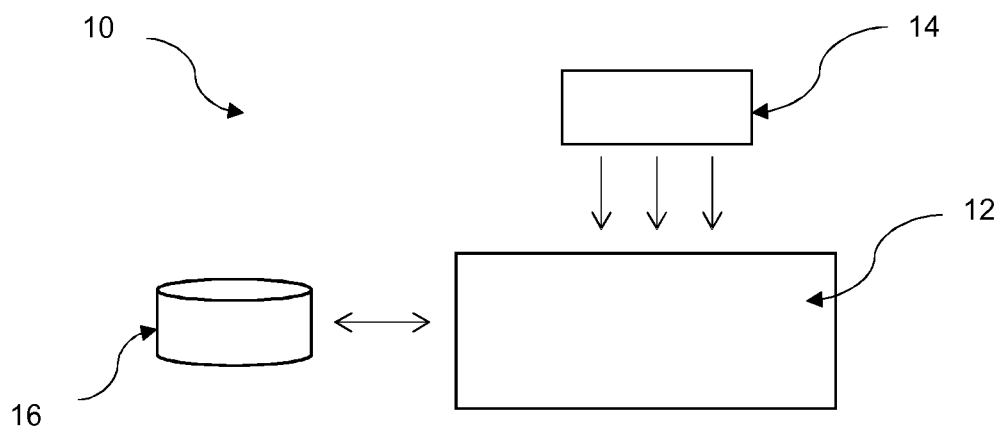
FIG. 2 is a functional representation of an apparatus for configuring carrier aggregation for a current user equipment.

FIG. 2 shows an apparatus 10 for configuring carrier aggregation for a current user equipment 14 located in a wireless communication network in a coverage area of the base station 1. The base station 1 is capable of emitting a plurality of carrier components pCC, sCC1, sCC2, sCC3 with a plurality transmission beams per carrier component using beamforming methods known in the art. The apparatus 10 comprises a controller 12 which may receive radio measurements from the current user equipment 14. In particular, the base station 1 receives radio measurements from the current user equipment 14 and transmits said radio measurement to the controller 12.

The apparatus 10 also comprises a database 16 communicating with the controller 12.

In particular, the controller 12 is arranged to estimate a location of the current user equipment 14. The controller 12 may be arranged to receive the location of the current user equipment 14 from a location management function comprised in the wireless communication network.

The controller 12 performs carrier aggregation configuration using the received radio measurements and/or the estimated location of the current user equipment 14. For example, the controller 12 may select one or more candidate carrier components to be configured or de-configured for the current user equipment as secondary carrier components using the database 16 and the received radio measurements and/or the estimated location of the current user equipment 14.

The one or more candidate carrier components are to be configured if said one or more candidate carrier components satisfy a quality metric threshold. Otherwise the one or more candidate carrier components are to be de-configured.

In an example embodiment, the database 16 comprises radio measurements of the transmission beams associated with a carrier component of the plurality of carrier components and with a user equipment of a plurality of user equipments. The radio measurements of the transmission beams may relate to reference signal received power (RSRP) or reference signal received quality (RSRQ) as reported by the user equipment for an identified couple (CC, beam) of a carrier component of the plurality of carrier components and a transmission beam of the plurality of transmission beams.

In an example embodiment, the database 16 further stores a location of each user equipment of the plurality of user equipments. In particular, the locations of the user equipments are obtained upon request by a Location Management Function of the network or through a trigger on the Minimization of Drive Tests as introduced in 3GPP Release-10.

In an example embodiment, the database 16 further stores a mean number of carrier components configured per user equipment at a given location.

The database 16 may be constructed through an online process by acquiring radio measurements of the transmission beams. The construction of the database 16 may be performed by the base station 1 or any other entity of the communication network for e.g. an xRAN controller. In particular, a data unit of the database such as the location and/or the radio measurements is acquired each time said data unit is available for a user equipment of the plurality of user equipments.

The apparatus 10 is intended to run in real time a method for carrier aggregation configuration/de-configuration. The database 16 and/or the controller 12 may be located either at the base station level or close to the base station 1 at an edge cloud or at a Radio Intelligent Controller (RIC).

Figure 3:
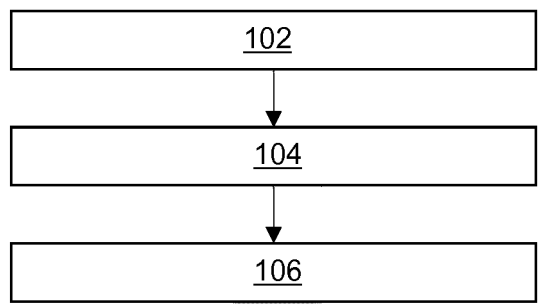
FIG. 3 is an iterative process for configuring carrier aggregation that may be performed by the apparatus of FIG. 2, in accordance with a first example embodiment.

A method 100 for configuring carrier aggregation according to a first example embodiment is depicted in FIG. 3. The method 100 comprises the following steps:

step 102: estimating a location of the current user equipment 14 located or entering in the coverage area of the base station 1, step 104: selecting one or more candidate carrier components from a look-up table stored in the database 16, in response to determining that the or each candidate carrier component satisfies a quality metric threshold based on the estimated location, step 106: configuring or de-configuring the one or more carrier components as secondary carrier components for the current user equipment 14. In the step 102, the location of the current user equipment 14 may be estimated using conventional positioning methods, for e.g. using Observed Time Difference Of Arrival (OT-DOA) or using a global navigation satellite system (GNSS). Alternatively, the location of the current user equipment 14 may be estimated using machine learning methods based on radio measurements of the current user equipment 14 such as RSRP. Such methods are described in "J. Yan, L. Zhao, J. Tang, Y. Chen, R. Chen and L. Chen, "Hybrid Kernel Based Machine Learning Using Received Signal Strength Measurements for Indoor Localization," in IEEE Transactions on Vehicular Technology, vol. 67, no. 3, pp. 2824-2829, March 2018".

The look-up table comprises for each of a plurality of locations of a user equipment of the plurality of user equipments, a quality metric of each carrier component of the plurality of carrier components. In particular, the quality metric is calculated using RSRP measurements of the transmission beams, comprised in the database 16, for a given carrier component at a given location. For example, such quality metric may be determined using the following equation $$\hat{f}_{i(x, y)} = \mathrm{norm}[\Sigma_{j-1}{}^{J}\mathrm{RSRP}_{j(x, y)}/J]$$

Where $\hat{f}_{i(x,y)}$ is the quality metric of the carrier component i at a location (x,y), $\mathrm{RSRP}_{j(x,y)}$ is a RSRP measurement for a transmission beam j for the carrier component i at location (x, y) and J is the total number of transmission beams reported at location (x, y). Normalization is used to obtain a quality metric within the interval between 0 and 1, and it is achieved using minimum and maximum possible values of beam RSRP measurements on all carrier components.

In an alternative embodiment, the quality metric is a cumulative density function, for example at 5% for all reported beams on each carrier component.

The look-up table may further comprise a mean number of carrier components configured per user equipment at each location.

In step 106, a carrier component will be a candidate to be configured if its quality metric is higher than a threshold value. The same carrier component will become a candidate to be de-configured/released if its quality metric is lower than a threshold value. The mean number of carrier components gives an indication about how many carrier components may have to be configured.

The method 100 may further comprise a step of updating the look-up table and the database 16 using radio measurements of the current user equipment.

The method 100 provides the advantage of allowing carrier aggregation with a reduced number of radio measurements reported by the current user equipment 14, thus reducing the latency of the communication network.

Figure 4:
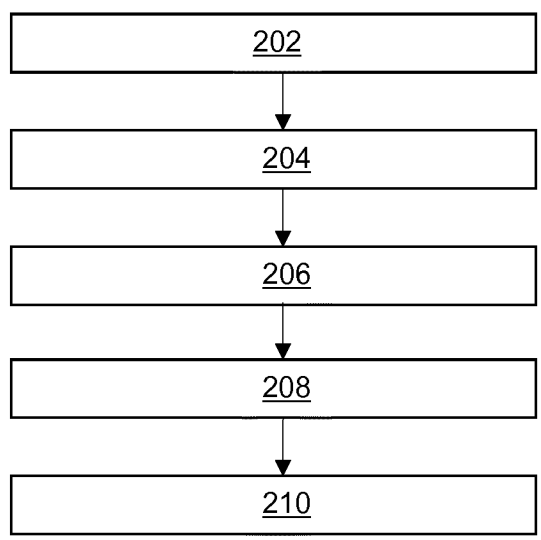
FIG. 4 is an iterative process for configuring carrier aggregation that may be performed by the apparatus of FIG. 2, in accordance with a second example embodiment.

A method 200 for configuring carrier aggregation according to a second example embodiment is depicted in FIG. 4. The method 200 comprises the following steps:
- step 202: acquiring radio measurements of the transmission beams of a predefined primary carrier component of the current user equipment 14,
- step 204: generating a current feature vector for the current user equipment, the current feature vector comprising radio measurements of the transmission beams of the primary carrier component,
- step 206: selecting one or more closest feature vectors from the database 16,
- step 208: selecting one or more candidate carrier components for the current user equipment 14 based on the closest feature vectors,
- step 210: configuring or de-configuring the one or more carrier components as secondary carrier components.

Preferably, the database 16 comprises a plurality of feature vectors where each feature vector comprises radio measurements of the transmission beams associated with a respective carrier component of the plurality of carrier components.

In step 202, radio measurements such as RSRP are acquired per transmission beam on the primary carrier component of the current user equipment 14.

An example current feature vector is described in the following table 1.

| CC ID | Location | Beam 1 | Beam 2 | Beam 3 | Beam 4 | ... |
|---|---|---|---|---|---|---|
| N | $X_n, Y_n$ | −55 | −46 | −60 | −49 | ... |

As shown in table 1, the current feature vector comprises an identification of the primary carrier component (CC ID) and the RSRP for each transmission beam (beam1, beam2, beam3, beam4, etc.). The current feature vector may comprise the location $(x_n, y_n)$ of the current user equipment 14.

In an embodiment, a Euclidean distance between the current feature vector and each remaining feature vectors is computed. When this distance is below a predefined distance threshold, the remaining feature vectors is selected as a closest feature vector. In particular, step 206 may be performed using a K-nearest neighbors algorithm. In practice, in step 206 the distance between the current feature vector and each feature vector comprised in the database 16 is calculated.

In step 208, one or more closest candidate carrier components associated with the closest feature vectors are selected. The step 208 further comprises selecting one or more candidate carrier components from the closest candidate carrier components to be configured in response to determining that the or each candidate carrier component satisfies a quality metric threshold. Actual configuration is performed in step 210.

In an embodiment, a look-up table is provided based on the database 16 and comprises the location of the current user equipment of the plurality of the current users associated with a mean number of carrier components per user equipment.

In step 208, if the location of the current user equipment 14 is available, the mean number 'm' is retrieved from the look-up table. Then, 'm' carrier components are selected from the carrier components associated with the 'm' closest feature vectors.

The step 210 may be similar to step 106 of FIG. 1.

The method 200 provides the advantage of determining the secondary carrier components to be configured/de-configured based on radio measurements of the transmission beams on the primary carrier component only. Thus, no extra measurements are needed. The method 200 allows reducing the latency of the communication network. Indeed, the estimation of the location of the user equipment is not required every time, which leads to optimized results taking into account the location of the user equipment when it is available.

Figure 5:
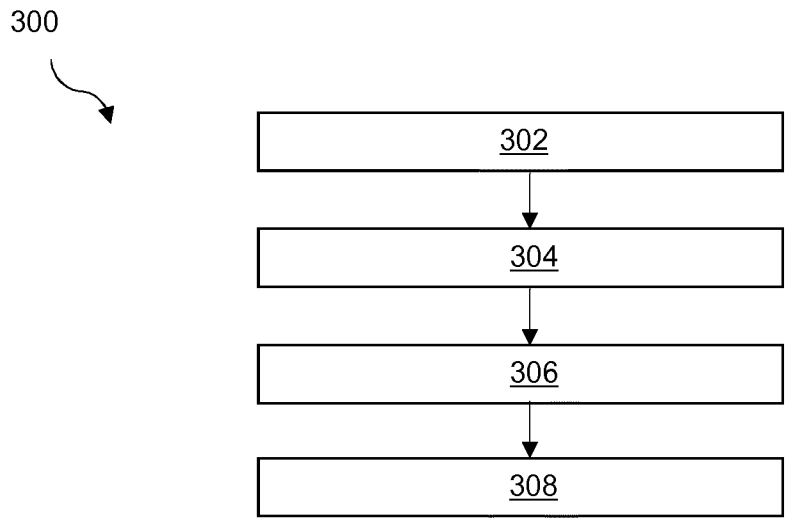
FIG. 5 is an iterative process for configuring carrier aggregation that may be performed by the apparatus of FIG. 2, in accordance with a third example embodiment.

A method 300 for configuring carrier aggregation according to a third example embodiment is depicted in FIG. 5. The method 300 comprises the following steps:
- step 302: acquiring radio measurements of the transmission beams of a predefined primary carrier component of the current user equipment 14,
- step 304: generating a current feature vector for the current user equipment, the current feature vector comprising radio measurements of the transmission beams of the primary carrier component, step 306: selecting one or more candidate carrier components for the current user equipment 14 based on the current feature vector and a predefined carrier aggregation model, step 308: configuring or de-configuring the one or more carrier components as secondary carrier components.

The step 302 and the step 304 may be performed in a similar way to step 202 and step 204 of FIG. 4.

In an example embodiment, the database 16 comprises a plurality of feature vectors where each feature vector comprises radio measurements of the transmission beams associated with a respective carrier component of the plurality of carrier components.

Preferably, the carrier aggregation model is a trained neural network providing one or more candidate carrier components given the current feature vector. In particular, the carrier aggregation model may be a classical FeedForward Network/Multi Layer perceptron Neural Network such as a deep neural network (DNN) trained on the database 16. Training may be performed on radio measurements of the transmission beams collected in the database 16 which maps inputs, i.e. features vectors to outputs, i.e. the one or more candidate carrier components, defined by their identification, to be configured or de-configured.

The training of the neural network is performed with known methods (backpropagation) and aims at estimating weights of the neural network to minimize a loss (e.g. the mean square root) between a provided output of the neural network and a predicted output.

In an embodiment, the training is performed offline. It can be implemented on top of the Radio Access Network, e.g. at the edge cloud.

The step 308 may be similar to step 106 of FIG. 1.

In an example embodiment, the method 100, 200 or 300 comprises a step of determining a level of confidence of the database 16. For example, the level of confidence is obtained as follows:

$$\delta_{RFCAM} = \frac{n_f}{n_{total}}$$

Where $\delta_{RFCAM}$ is the level of confidence, $n_f$ is the number of the radio measurements comprised in the database 16 and $n_{total}$ is the total number of possible radio measurements for the plurality of carrier components and transmission beams.

If the level of confidence is below a predefined threshold, the method 100, 200 or 300 may comprise a step of selecting one or more candidate carrier component using traditional approaches such as blind configuration or A6 measurement reports as described in 3GPP Release-10.

Figure 6:
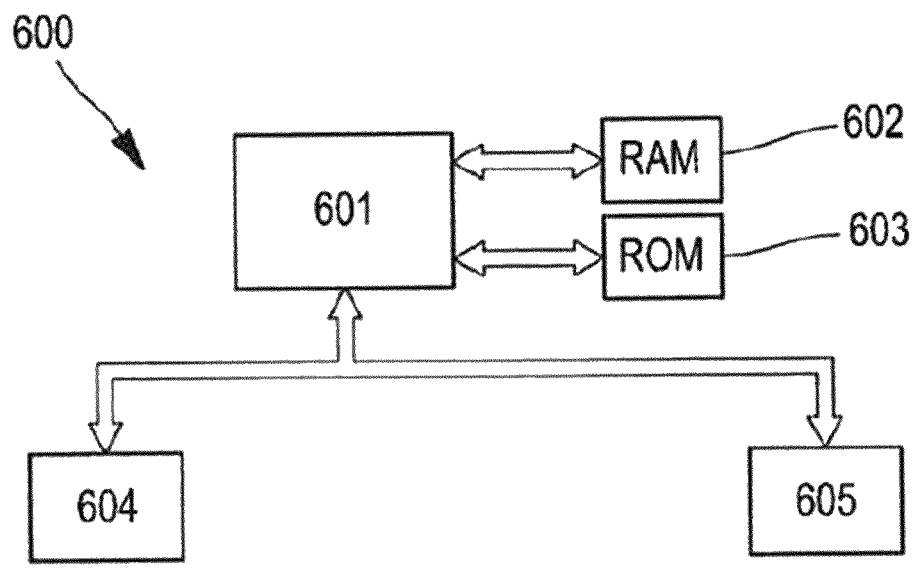
FIG. 6 is a functional diagram of a programmed computer in which example embodiments of the invention may be implemented.

FIG. 6 shows a functional diagram of a programmed computer, server, circuitry, or apparatus 600 that may be used for a purpose of implementing the above described methods. Computer 600 has a core and several peripherals connected via a communication bus. The major components of the core are a microprocessor 601 (often called the CPU) random access memory (RAM) 602 and read only memory (ROM) 603. The peripherals comprise devices that allow information to be input to the system from users, output to users and stored and retrieved (mass storage devices 604 such as hard disks and network interfaces 605).

The invention is not limited to the described example embodiments. The appended claims are to be construed as embodying all modifications and alternative constructions that may occur to one skilled in the art, and which fairly fall within the basic teaching as set forth herein.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The example embodiments may be implemented by means of hardware as well as software. The same item of hardware may represent several "means".

In the claims, any reference signs placed between parentheses shall not be construed as limiting the scope of the claims.

The invention claimed is:

1. A method for configuring carrier aggregation for a current user equipment located in a wireless communication network in a coverage area of a base station which is capable of emitting a plurality of carrier components with a plurality transmission beams per carrier component, the method comprising:
    retrieving one or more feature vectors from a database comprising plurality of feature vectors, each feature vector comprising radio measurements of the transmission beams associated with a respective carrier component of the plurality of carrier components;
    acquiring radio measurements of the transmission beams of a predefined primary carrier component of the current user equipment;
    generating a current feature vector for the current user equipment, the current feature vector comprising radio measurements of the transmission beams of the primary carrier component;
    determining, using the one or more feature vectors retrieved from the database, one or more candidate carrier components to be configured or de-configured for the current user equipment as secondary carrier components; and
    configuring or de-configuring said one or more candidate carrier components,
    wherein a candidate carrier component is to be configured responsive to determining that said candidate carrier component satisfies a predefined criterion, and wherein said candidate carrier component is to be de-configured responsive to determining otherwise.

2. The method according to claim 1, wherein the determining of one or more candidate carrier components comprises:
    selecting one or more closest feature vectors among the feature vectors retrieved from the database, wherein a distance between the current feature vector and each closest feature vector is below a predefined distance threshold.

3. The method according to claim 2, wherein the determining of one or more candidate carrier components further comprises:
    selecting one or more candidate carrier components associated with a or each closest feature vector and satisfying a quality metric threshold.

4. The method according to claim 2, wherein the determining of one or more candidate carrier components further comprises:
    estimating a location of the user equipment; and
    selecting a number of candidate carrier components based on the location of the current user equipment and a look-up table,
    wherein the look-up table associates to each of a plurality of locations of the current user equipment an average number of carrier components, wherein said average number of carrier components is selected as the number of the candidate carrier components.

5. The method according to claim 4, wherein the average number of carrier components is determined based on the database.

6. The method according to claim 1, wherein the determining of one or more candidate carrier components comprises:
selecting one or more candidate carrier components for the current user equipment using the current feature vector and a predefined carrier aggregation model,
wherein the carrier aggregation model provides the one or more candidate carrier components as a function of the current feature vector.

7. The method according to claim 6, wherein the carrier aggregation model is a trained neural network, and wherein the training of the neural network is performed based on the database.

8. The method according to claim 1, wherein each feature vector of the database further comprises a location of the radio measurements of the transmission beams, and the current feature vector further comprises the location of the current user equipment.

9. The method according to claim 1, wherein the database comprises a number of radio measurements of transmission beams higher than a predefined number.

10. A method for configuring carrier aggregation for a current user equipment located in a wireless communication network in a coverage area of a base station which is capable of emitting a plurality of carrier components with a plurality transmission beams per carrier component, the method comprising:
retrieving one or more quality metrics from a look-up table comprising for each of a plurality of locations of a user equipment of the plurality of user equipments, a quality metric of each carrier component of the plurality of carrier components;
estimating a location of the current user equipment;
selecting one or more candidate carrier components satisfying a quality metric threshold based on the location of the current user equipment and the look-up table; and
configuring or de-configuring said one or more candidate carrier components,
wherein a candidate carrier component is to be configured responsive to determining that said candidate carrier component satisfies a predefined criterion, and wherein said candidate carrier component is to be de-configured responsive to determining otherwise.

11. The method according to claim 10, further comprising determining said quality metric of a or each carrier component of the plurality of carrier components, wherein the quality metric of a carrier component of the plurality of carrier components for a location of a user equipment of the plurality of user equipments is an arithmetic mean of radio measurements of the plurality of the transmission beams at the location of the user equipment.

12. The method according to claim 10, wherein the quality metric is a mean reference signal received power or a mean reference signal received quality or a value of cumulative density function.

13. An apparatus for configuring carrier aggregation for a current user equipment located in a wireless communication network in a coverage area of a base station which is capable of emitting a plurality of carrier components with a plurality transmission beams per carrier component, the apparatus comprising:
at least one processor; and
at least one memory including computer program code, the at least one memory and computer program code being configured, with the at least one processor, to cause the apparatus to perform:
retrieving one or more feature vectors from a database comprising plurality of feature vectors, each feature vector comprising radio measurements of the transmission beams associated with a respective carrier component of the plurality of carrier components;
acquiring radio measurements of the transmission beams of a predefined primary carrier component of the current user equipment;
generating a current feature vector for the current user equipment, the current feature vector comprising radio measurements of the transmission beams of the primary carrier component;
determining, using the one or more feature vectors retrieved from the database, one or more candidate carrier components to be configured or de-configured for the current user equipment as secondary carrier components; and
configuring or de-configuring said one or more candidate carrier components,
wherein a candidate carrier component is to be configured responsive to determining said candidate carrier component satisfies a predefined criterion, and wherein said candidate carrier component is to be de-configured responsive to determining otherwise.

14. The apparatus according to claim 13, wherein the determining of one or more candidate carrier components comprises:
selecting one or more closest feature vectors among the feature vectors retrieved from the database, wherein a distance between the current feature vector and each closest feature vector is below a predefined distance threshold.

15. The apparatus according to claim 14, wherein the determining of one or more candidate carrier components further comprises:
selecting one or more candidate carrier components associated with a or each closest feature vector and satisfying a quality metric threshold.

16. The apparatus according to claim 14, wherein the determining of one or more candidate carrier components further comprises:
estimating a location of the user equipment; and
selecting a number of candidate carrier components based on the location of the current user equipment and a look-up table,
wherein the look-up table associates to each of a plurality of locations of the current user equipment an average number of carrier components, wherein said average number of carrier components is selected as the number of the candidate carrier components.

17. The apparatus according to claim 16, wherein the average number of carrier components is determined based on the database.

18. The apparatus according to claim 13, wherein the determining of one or more candidate carrier components comprises:
selecting one or more candidate carrier components for the current user equipment using the current feature vector and a predefined carrier aggregation model, wherein the carrier aggregation model provides the one or more candidate carrier components as a function of the current feature vector.

19. An apparatus for configuring carrier aggregation for a current user equipment located in a wireless communication network in a coverage area of a base station which is capable of emitting a plurality of carrier components with a plurality transmission beams per carrier component, the apparatus comprising:

at least one processor; and at least one memory including computer program code, the at least one memory and computer program code being configured, with the at least one processor, to cause the apparatus to perform:

retrieving one or more quality metrics from a look-up table comprising for each of a plurality of locations of a user equipment of the plurality of user equipments, a quality metric of each carrier component of the plurality of carrier components;

estimating a location of the current user equipment;

selecting one or more candidate carrier components satisfying a quality metric threshold based on the location of the current user equipment and the look-up table; and configuring or de-configuring said one or more carrier components, wherein a candidate carrier component is to be configured responsive to determining that said candidate carrier component satisfies a predefined criterion, and wherein said candidate carrier component is to be de-configured responsive to determining otherwise.

20. The apparatus according to claim 19, wherein the at least one memory and computer program code are further configured, with the at least one processor, to cause the apparatus to perform determining said quality metric of a or each carrier component of the plurality of carrier components, wherein the quality metric of a carrier component of the plurality of carrier components for a location of a user equipment of the plurality of user equipments is an arithmetic mean of radio measurements of the plurality of the transmission beams at the location of the user equipment.

* * * * *